(12) United States Patent
Fossato et al.

(10) Patent No.: US 10,723,413 B2
(45) Date of Patent: Jul. 28, 2020

(54) BICYCLE MANUAL CONTROL DEVICE AND BICYCLE ELECTRONIC SYSTEM

(71) Applicant: Campagnolo S.r.l., Vicenza (IT)

(72) Inventors: Fabiano Fossato, Campagna Lupia (IT); Marco Masciolini, Padua (IT)

(73) Assignee: Campagnolo S.r.l., Vicenza (IT)

( * ) Notice: Subject to any disclaimer, the term of this patent is extended or adjusted under 35 U.S.C. 154(b) by 141 days.

(21) Appl. No.: 15/945,372

(22) Filed: Apr. 4, 2018

(65) Prior Publication Data

US 2018/0290714 A1    Oct. 11, 2018

(30) Foreign Application Priority Data

Apr. 6, 2017    (IT) ................. 102017000038213

(51) Int. Cl.
| | |
|---|---|
| *B62M 25/08* | (2006.01) |
| *G06F 1/32* | (2019.01) |
| *G06F 1/3234* | (2019.01) |
| *G06F 1/3287* | (2019.01) |
| *B62M 9/132* | (2010.01) |

(52) U.S. Cl.
CPC ............ *B62M 25/08* (2013.01); *B62M 9/132* (2013.01); *G06F 1/325* (2013.01); *G06F 1/3287* (2013.01)

(58) Field of Classification Search
CPC ...... B62M 9/122; B62M 9/132; B62M 25/04; B62M 25/08; B62M 2025/003; B62K 23/06; B62L 3/02; G06F 1/325; G06F 1/3287

See application file for complete search history.

(56) References Cited

U.S. PATENT DOCUMENTS

| | | |
|---|---|---|
| 5,470,277 A | 11/1995 | Romano |
| 6,023,646 A | 2/2000 | Kubacsi et al. |
| 6,060,982 A | 5/2000 | Holtrop |
| 6,204,775 B1 | 3/2001 | Kubacsi |
| 6,559,767 B2 | 5/2003 | Huang |
| 6,623,389 B1 | 9/2003 | Campagnolo |
| 7,062,980 B2 | 6/2006 | Takamoto et al. |
| 7,176,902 B2 | 2/2007 | Peterson, Jr. et al. |

(Continued)

FOREIGN PATENT DOCUMENTS

| | | |
|---|---|---|
| EP | 0841243 A1 | 5/1998 |
| EP | 1584551 B1 | 6/2007 |

(Continued)

OTHER PUBLICATIONS

Italian Search Report and Written Opinion in IT Patent Application No. 102017000038213, dated Nov. 29, 2017 and English Translation.

*Primary Examiner* — Adam D Rogers
(74) *Attorney, Agent, or Firm* — Volpe and Koenig, P.C.

(57) ABSTRACT

A bicycle manual control device for issuing at least one electric-electronic command to at least one piece of bicycle equipment, comprising a support body, configured to be fixed to the bicycle, at least one manual actuation member supported in a movable manner by the support body, and on-board electronics having a standby mode and an operating mode, further comprising a detector of movement of the bicycle configured to emit a wake signal to bring said on-board electronics from standby mode to operating mode. A bicycle electronic system including the bicycle manual control device is also disclosed.

19 Claims, 2 Drawing Sheets

(56) References Cited

U.S. PATENT DOCUMENTS

| | | |
|---|---|---|
| 7,623,931 B2 | 11/2009 | Campagnolo et al. |
| 7,761,212 B2 | 7/2010 | Takebayashi |
| 7,902,967 B2 | 3/2011 | Takebayashi |
| 8,655,548 B2 | 2/2014 | Ichida et al. |
| 8,721,495 B2 | 5/2014 | Kitamura et al. |
| 8,878,658 B2 | 11/2014 | Hara |
| 8,900,078 B2 | 12/2014 | Yamaguchi et al. |
| 8,909,424 B2 | 12/2014 | Jordan et al. |
| 9,056,651 B2 | 6/2015 | Tetsuka |
| 9,593,764 B2 * | 3/2017 | Hashimoto ............ F16H 59/044 |
| 9,802,669 B2 * | 10/2017 | Jordan ................... B62K 23/02 |
| 9,919,616 B2 * | 3/2018 | Watarai ................... B60L 15/20 |
| 10,416,186 B2 * | 9/2019 | Nichols .................... B62M 6/50 |
| 2005/0255950 A1 | 11/2005 | Takebayashi et al. |
| 2006/0058134 A1 | 3/2006 | Mercat et al. |
| 2006/0064223 A1 | 3/2006 | Voss |
| 2006/0077678 A1 | 4/2006 | Chen |
| 2009/0102628 A1 | 4/2009 | Takebayashi |
| 2009/0240858 A1 | 9/2009 | Takebayashi |
| 2009/0315692 A1 | 12/2009 | Miki et al. |
| 2010/0215434 A1 | 8/2010 | Wolf |
| 2011/0312286 A1 | 12/2011 | Lin et al. |
| 2011/0320093 A1 | 12/2011 | Kitamua |
| 2012/0035011 A1 | 2/2012 | Menachem et al. |
| 2012/0265413 A1 | 10/2012 | Lin et al. |
| 2012/0303195 A1 | 11/2012 | Boyle |
| 2012/0322591 A1 | 12/2012 | Kitamura et al. |
| 2014/0298943 A1 | 10/2014 | Hashimoto |
| 2016/0311491 A1 | 10/2016 | Watarai |
| 2016/0339986 A1 | 11/2016 | Jordan et al. |
| 2018/0178881 A1 * | 6/2018 | Miglioranza .......... B62M 9/132 |
| 2018/0180640 A1 * | 6/2018 | Miglioranza ............ G01P 3/44 |

FOREIGN PATENT DOCUMENTS

| | | |
|---|---|---|
| EP | 1475302 B1 | 7/2007 |
| EP | 2719616 A2 | 4/2014 |
| GB | 2492742 A | 1/2013 |
| JP | 09058562 A | 3/1997 |
| WO | 2011010865 A2 | 1/2011 |

* cited by examiner

BICYCLE MANUAL CONTROL DEVICE AND BICYCLE ELECTRONIC SYSTEM

CROSS REFERENCE TO RELATED APPLICATION

This application claims the benefit of Italian Patent Application No. 102017000038213, filed on Apr. 6, 2017, which is incorporated herein by reference as if fully set forth.

FIELD OF INVENTION

The present invention relates, in general, to a bicycle manual control device as well as to a bicycle electronic system comprising information technology.

The present invention relates more specifically to a manual control device for a bicycle for issuing at least one electrical-electronic command to at least one piece of equipment of the bicycle, such as in particular an electromechanical derailleur or a cycle computer.

BACKGROUND

In the present description and in the attached claims, the expression "manual control device for a bicycle for issuing at least one electrical-electronic command" should not be taken in a limiting sense to exclude that the manual control device can also issue one or more mechanical commands to one or more pieces of mechanical equipment of the bicycle, such as for example a mechanical derailleur and/or a mechanical brake.

In the present description and in the attached claims, the expression "manual control device for a bicycle for issuing at least one command" or briefly "manual control device" or even just "control device" will therefore refer to a manual control device capable of issuing one or more electrical-electronic and/or mechanical commands to one or more pieces of electrical-electronic and/or mechanical and/or pneumatic equipment of the bicycle, such as a derailleur, a brake, a cycle computer, and the like.

Known control devices for a bicycle comprise one or more manual actuation members, of the lever type, namely rigid bodies actuated with a rotary movement about a pivot or fulcrum, or of the button type, namely actuated with a linear movement, said manual actuation members being actuatable with one finger or more fingers. Typically, the manual actuation members are supported by a body adapted to be fixed to the bicycle, typically at a handgrip portion of the handlebars.

The number, type, shape and position of manual control devices in a bicycle can change based on requirements, in particular based on the number and type of controlled pieces of equipment provided in the bicycle.

In greater detail, a bicycle typically comprises a rear brake associated with the rear wheel and/or a front brake associated with the front wheel, which are controlled by suitable control devices. The manual actuation member associated with a brake typically comprises a brake lever hinged onto the support body to actuate the brake by the traction of an inextensible cable, usually sheathed (Bowden cable), when it is pulled towards the handlebars.

Moreover, a motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore provided with a gearshift, a front derailleur and/or a rear derailleur is provided for.

Manual actuation members can be provided for to issue a command to increase the gear ratio and a command to decrease the gear ratio, control electronics being provided for that suitably drive the front and/or rear derailleur in order to actuate each command.

Alternatively, one or more manual actuation members can be provided for to issue a displacement command in one direction and a displacement command in an opposite direction of each derailleur that is present.

In a typical configuration, a manual control device of the front derailleur and a manual control device of the rear derailleur—or only one of the two in the case of simpler gearshifts—are mounted so as to be easily maneuvered by the cyclist, usually on the handlebars, close to the handgrips thereof where the brake lever for controlling the brake of the front and rear wheel, respectively, is also located. Such integrated manual control devices comprise, in particular, a brake lever, a first gearshift lever for example arranged behind the brake lever, and a second gearshift lever for example arranged on a proximal surface of a body for fixing the manual control device to the bicycle.

Specialized handlebars for speed racing are also known, which have two or four bars or ends facing prominently forwards, which allow the cyclist to maintain a position of the torso greatly inclined forwards, which is aerodynamically efficient. With these handlebars, specific control devices are also used, both for the brakes and for the gearshift; these devices are commonly called bar-end since they are indeed housed at the ends of the handlebars, so that the cyclist can actuate them easily without having to change his/her position.

Manual control devices are also known in which a single lever is able to rotate about two or three axes to perform two or three functions—typically the brake control lever function, the upward gearshifting control lever function and/or the downward gearshifting control lever function—as well as manual control devices wherein a single lever is able to rotate in opposite directions and/or by different angles for inputting different commands and/or wherein different commands are associated with the actuation of a manual actuation member for different timeframes or according to different modes.

Therefore, the number, type, shape and position of the manual actuation members in a same manual control device can also change based on the requirements and/or the functions.

In order to issue at least one electric-electronic command, an actuation detector is provided for, which detects the position of one or more manual actuation members and/or the change of position thereof over time, typically between a rest position and at least one operating position.

The type of actuation detector depends on the features of the associated manual actuation member.

In some cases, the actuation detector is an electric switch, of the microswitch type, including a deformable dome-shaped diaphragm. In order to switch the switch, an actuation head fixed to the respective manual actuation member faces the deformable diaphragm in the rest condition of the manual actuation member, and acts by pushing onto the deformable diaphragm in the actuation condition of the manual actuation member.

In other cases, it can be a magnetic sensor that cooperates with at least one element made of paramagnetic/ferromagnetic material moved by the at least one manual actuation member, or an optical sensor, etc. Detectors of this kind are described in U.S. Pat. No. 9,056,651 B2.

Some known manual control devices are also provided with their own electronics, hereinafter called on-board electronics of the manual control device.

Such on-board electronics of the manual control device can comprise, for example, the aforementioned actuation detectors of the manual actuation members, processing components of the signals generated by the actuation detectors, as well as communication electronics with the controlled piece of equipment and/or with other components of the bicycle electronic system of which the manual control device and the controlled piece of equipment are part, for example communication electronics with a control station that receives the commands generated by all the manual control devices of the electronic system and routes them to the various controlled pieces of equipment.

The on-board electronics of the manual control device, as well as all the other aforementioned pieces of electrical, electronic and electromechanical equipment, consumes electrical energy, supplied by one or more battery power supply units of the bicycle, optionally rechargeable. In the case of the manual control device, in particular if the actuation detectors always remain active or in operating mode, the energy consumption can be high, thereby reducing in a non-negligible manner the autonomy of the manual control device or in general of the bicycle electronic system of which it is part.

Although it is possible to exploit, for recharging, the movement of the bicycle itself through a dynamo, it is nevertheless important to save as much energy as possible.

The various apparatuses are therefore sometimes provided not only with a proper on/off switch, but also with a standby or wait or sleep or low consumption mode.

Under standby mode, a condition in which an electrical, electronic or electromechanical device is not operating, though is ready to switch from a temporary inactivity state to operating mode is meant to be indicated; in standby mode, only those circuits that allow the device to start upon receiving commands or generally inputs that involve the actuation thereof are typically kept operating, thus there is a low consumption of electrical energy.

Vice-versa, in an operating mode, an electrical, electronic or electromechanical device is ready to receive commands or generally inputs and to perform tasks, even though it can be engaged only in waiting for commands and inputs, without performing any specific task.

The switching from a standby mode to an operating mode is indicated herein as wake of a device. More in general, under wake of a device, maintaining a device in an operating mode preventing it from entering a standby mode is meant to be encompassed. A same signal or a similar signal can be used in both cases.

For apparatuses arranged in parts of the bicycle remote from the cyclist's hands, such as for example the derailleurs, brakes and suspensions, the wake signal is typically a signal, specific or not, received from another on-board apparatus, for example from the associated manual control device.

For example, U.S. Pat. No. 8,909,424 B2 discloses a wireless bicycle electronic derailleur comprising a controller including a wireless receiver that receives gearshifting request signals from a wireless transmitter, wherein the controller includes a CPU and a wake sensor operatively connected to the CPU. The wake sensor is of a vibrational type, but the document generically discloses that magnetic Reed switches could be used, configured to detect magnets attached to movable elements of the bicycle.

For bicycle apparatuses that can be reached by the cyclist, such as the aforementioned manual control devices associated with the handgrips of the handlebars or cycle computers fixed to the handlebars or in the front part of the frame, the wake signal has been so far associated with the pressing of a button or with the actuation of a lever by the cyclist.

For example, the aforementioned document U.S. Pat. No. 9,056,651 B2 discloses a bicycle control device, comprising an operating member, a detecting member configured to detect the movement of the operating member and a switching member, electrically connected to the detecting member and configured to switch the detecting member from a power-off state to a power-on state in response to a movement of the operating member. In this way, electrical energy is saved by keeping the detecting member in a power-off state until the manual actuation member is actuated.

The Applicant observes that in this case the detecting members are truly turned off, and that in the case in which the manual control device has its own incorporated cycle computer, no standby mode of the latter is provided for.

SUMMARY

The Applicant has now perceived that if, to generate a wake signal for the manual control device, one waits for the cyclist to actuate the manual actuation member, there can be an undesired delay in routing into the electronic system the control signal addressed to the piece of equipment that the cyclist intended to generate.

On the other hand, it is desirable for the on-board electronics of each manual control device to be constantly kept in operating mode when the bicycle is in use, so that it is ready to generate and transmit the control signals addressed to the controlled piece(s) of equipment of the bicycle.

This problem is even more felt in the case of an electronic system wherein the communication of the manual control device with the rest of the electronic system of which it is part is synchronous, as explained more clearly hereinafter.

The technical problem at the basis of the present invention is to create an improved bicycle manual control device, wherein, even though is an advantageous energy saving, the delay in emitting control signals is minimized.

In one aspect, the invention relates to a bicycle manual control device for issuing at least one electric-electronic command to at least one piece of bicycle equipment, comprising:

a support body, configured to be fixed to the bicycle,
at least one manual actuation member supported in a movable manner by the support body, and
on-board electronics having a standby mode and an operating mode,
further comprising a detector of movement of the bicycle configured to emit a wake signal to bring said on-board electronics from the standby mode to the operating mode.

The present invention applies to all types of manual control devices described above, and in principle to any manual device suitable for issuing electrical-electronic commands to pieces of equipment of the bicycle, such as a derailleur, suspensions, lighting systems, satellite navigators, training devices, anti-theft devices, cycle computers capable of providing information on the state of the bicycle, of the cyclist and/or of the route, etc.

BRIEF DESCRIPTION OF THE DRAWINGS

Further features and advantages of the present invention will become clearer from the following detailed description of some preferred embodiments thereof, made with reference to the attached drawings. The different features illustrated and described with reference to the single configurations can be combined as desired. In the following description, to illustrate the figures, identical or similar reference numerals are used to indicate structural or functional elements with the same or analogous function. In the drawings.

DETAILED DESCRIPTION OF THE PREFERRED EMBODIMENTS

In one aspect, the invention relates to a bicycle manual control device for issuing at least one electric-electronic command to at least one piece of bicycle equipment, comprising:

a support body, configured to be fixed to the bicycle, at least one manual actuation member supported in a movable manner by the support body, and on-board electronics having a standby mode and an operating mode, further comprising a detector of movement of the bicycle configured to emit a wake signal to bring said on-board electronics from the standby mode to the operating mode.

Through such a wake signal it is possible to bring the components of the on-board electronics into an operating mode from a standby mode, and possibly keep them in such operating mode.

Only when the bicycle is stopped for a prolonged period, the components of the on-board electronics of each manual control device can enter standby mode. The on-board electronics can for example be sent back into standby when a suitable timer runs out, said timer being however reset every time the movement detector detects the movement of the bicycle. In order to distinguish a prolonged stop, for example in a parking space or garage, from a temporary stop, for example at a traffic light, it is therefore possible to use the same wake signal emitted by the movement detector to prevent standby mode from being entered, namely as anti-sleep signal.

Thanks to entering standby mode, the manual control device achieves an overall energy saving, despite the energy consumption of the movement detector.

In this regard, it should be noted that in the case of a manual control device used to issue control signals to a derailleur, the manual control device typically comprises two, or even three, actuation detectors that can be sent into standby, besides the possible processing and communication electronics.

Furthermore, the movement detector can be actuated to carry out checks of the movement state of the bicycle even at comparatively long time intervals, and/or it can have lower electrical consumption, with respect to the actuation detectors of the manual actuation members, so that the electrical consumption thereof is comparatively low.

The wake signal emitted by the movement detector can furthermore be exploited to wake from a standby mode not only the on-board electronics of the manual control device, but also other pieces of equipment or in general electronic devices of an electronic system of the bicycle, such as for example a controller of the derailleur of the gearshift or a display of a cycle computer with which the bicycle can be provided; it should be understood that such other pieces of equipment of the bicycle could alternatively be provided with their own movement detector suitable for generating a suitable wake signal.

Furthermore, the wake signal emitted by the movement detector could be exploited to wake from a standby mode a battery power supply unit, when embodied by a smart battery, both in case the latter is a dedicated battery power supply unit of the control device, and in case it is located elsewhere on the bicycle frame.

Preferably, the movement detector comprises a vibration sensor.

The vibration sensor, for example embodied by piezoelectric accelerometer, detects the vibrations caused by irregularities in the road surface or in general by the motion of the transmission system of the bicycle.

Alternatively, the movement detector can be embodied by another type of sensor, for example a clinometer, a gyroscope, etc.

Preferably, also the movement detector has a standby mode.

The on-board electronics, once it has been brought into operating mode through the wake signal generated by the movement detector, can advantageously send the latter into standby mode.

Alternatively, the movement detector can be configured to automatically enter standby mode immediately after the wake signal has been sent to the on-board electronics.

In both cases, the on-board electronics is advantageously configured to remain in operating mode until a sleep condition has been reached, the movement detector then entering operating mode.

In order to determine said sleep condition of the on-board electronics, it is no longer possible to use the configuration described above of a timer to send the on-board electronics into standby mode, which is reset by the wake signal generated by the movement detector. The on-board electronics is therefore sent into standby mode, and the movement detector is awoken for example upon instructions by the controlled piece of equipment or by another component of the electronic system of which it is part. Alternatively, the on-board electronics wakes the movement detector and automatically enters standby mode when the components of the on-board electronics intended for communication do not receive feedback signals from the controlled piece of equipment for a certain time period.

Preferably, the on-board electronics comprises at least one actuation detector configured to detect the actuation by a cyclist of said at least one manual actuation member and generate a control signal in response thereto.

More preferably, said at least one actuation detector is embodied by a sensor.

Even more preferably, said at least one actuation detector comprises a magnetic field sensor.

Alternatively, said at least one actuation detector is a switch.

An actuation detector of the sensor type has a response time that can be quite long and that in general is longer than the response time of an actuation detector of the switch type. Furthermore, an actuation detector of the sensor type has a non-negligible energy consumption. Moreover, an actuation detector of the sensor type may be preferable with respect to a switch because it allows the mechanical components of the manual control device to be decoupled from the electronic ones, which in turn allows the electronic components to be suitably insulated from the external environment.

Preferably, the on-board electronics comprises a processing module of the control signal generated by the at least one actuation detector.

The processing module comprises for example electronic components for amplification, filtering and/or approximation, quantization, binarization, digitalization, inversion, etc.

The signal processing module is for example embodied by a controller or, more specifically, by a microcontroller.

In the present description and in the attached claims, under "controller" or "microcontroller" a logic unit should be meant, which can nevertheless be formed of plural physical units, in particular of one or more distributed microprocessors that can be contained in one or more casings together with one or more of the other components of the on-board electronics or more in general of the control device.

Preferably, alternatively or in addition, the on-board electronics comprises a communication module configured to send, directly or indirectly, said possibly processed control signal to said at least one controlled piece of equipment.

In particular, such communication module is configured to transmit, according to a specific protocol, the control signal generated by the actuation detector—and possibly processed by the processing module—to another communication module with which the at least one controlled piece of equipment is provided. In some cases, the transmission is direct; in other cases the control signal can be first transmitted to an intermediate unit that in turn sends it, directly or indirectly, to the controlled piece of equipment, such as for example a central processing unit of the bicycle electronic system or a so-called interface unit that receives the commands from all the manual control devices of the bicycle electronic system.

The communication module is preferably a transceiver, also capable of receiving feedback signals from the at least one controlled piece of equipment. Such feedback signals can possibly be translated into a visual or audible feedback for the cyclist, by providing for example, on the manual control device, luminous or sound signaling devices (for example LEDs) that are activated when such a feedback signal arrives from the controlled piece of equipment.

Preferably, the manual control device comprises an electric power supply circuit.

In embodiments, the electric power supply circuit comprises a battery power supply source.

In particular, the electric power supply circuit could comprise a so-called smart battery, namely provided with a dedicated control processing unit, such as a microprocessor, of a memory of battery data such as optimal operating parameters, charging/discharging cycles, residual charge, etc.

Preferably, the battery power supply source is supported by, and in particular is housed within, the support body of the manual control device.

In this case, the battery power supply source is preferably dedicated to the manual control device.

In other embodiments, the electric power supply circuit is configured to absorb energy from a radio frequency electromagnetic field generated in the bicycle electronic system of which the manual control device is part.

The radio frequency power supply source exploits in particular RFID (Radio Frequency Identification) technology, per se well known and therefore not described in detail.

The on-board electronics can in this way be powered by a battery power supply source shared by one or more pieces of equipment of the electronic system; in such case, the battery power supply source can be suitably positioned on the bicycle frame, located for example at the attachments of a bottle-holder or close to the seat tube, or close to other pieces of equipment of the bicycle that share the same battery power supply source.

As an alternative to the use of RFID technology, the on-board electronics can be wired to the shared battery power supply source.

In another aspect, the invention relates to a bicycle electronic system, comprising at least one manual control device as stated above, and at least one piece of equipment controlled by said at least one manual control device.

Preferably, the at least one manual control device comprises a first communication module, and a component of the electronic system, preferably the at least one piece of equipment controlled by said manual control device, comprises a second communication module, the first communication module and the second communication module being configured to communicate with each other.

Preferably, the first communication module and the second communication module follow a synchronous communication protocol.

Such communication protocol, in which the communication modules are synchronized with a common time reference, involves an overall low energy consumption in the bicycle system; furthermore, it allows a bidirectional communication and high strength and security against external interference and intrusions, allowing secure encryptions to be used.

However, the communication modules can alternatively follow an asynchronous communication protocol. According to this alternative, the energy consumption of the first communication module is advantageously reduced since the communication can be limited to the transmission of the control signal, though in this case the bidirectional communication is waived. Moreover, the consumption of the second communication module could be greater.

Preferably, the first communication module and the second communication module are wireless communication modules.

Preferably, the movement detector of the control device is configured to send a wake signal also to the at least one controlled piece of equipment.

Figure 1:
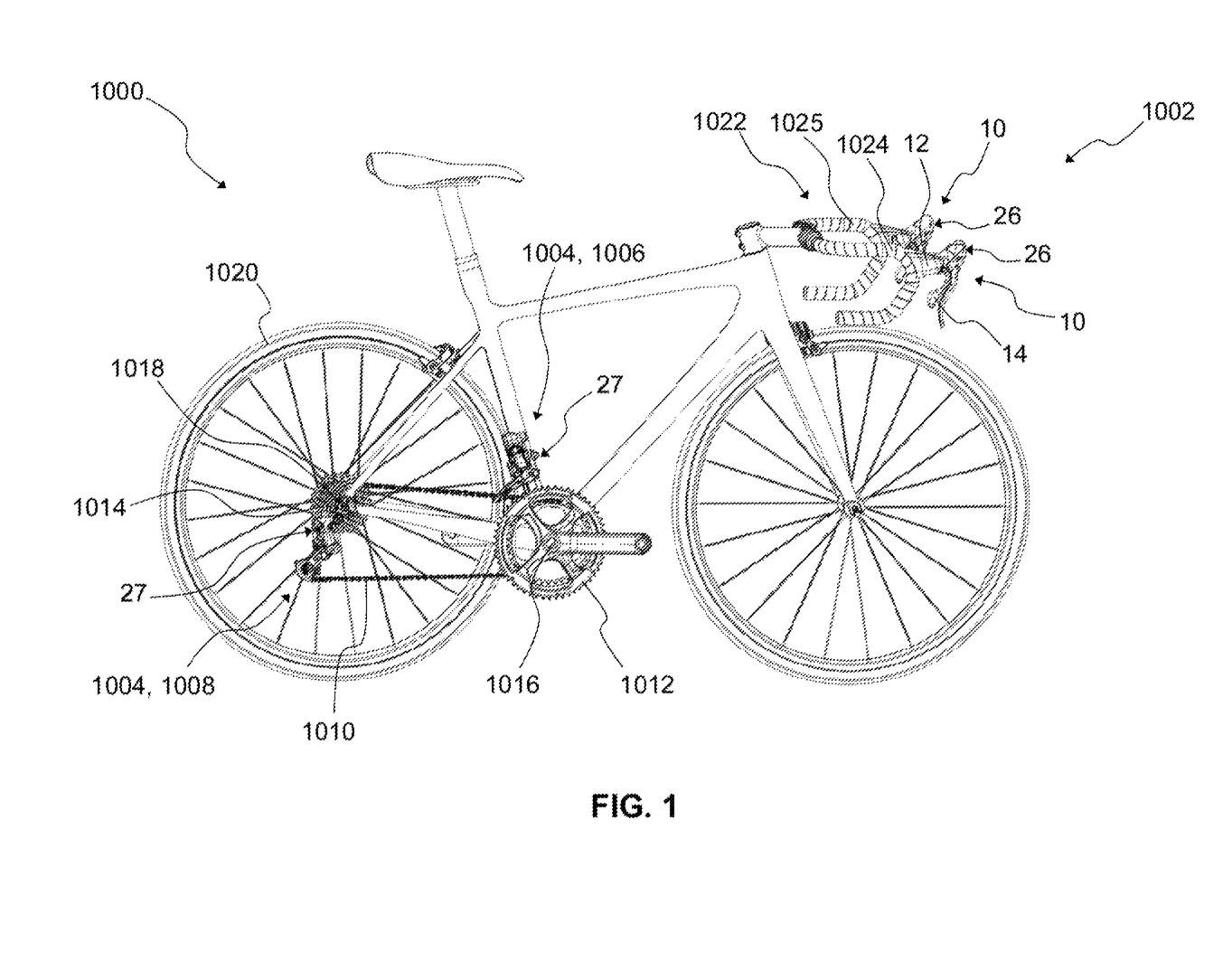
FIG. 1 is a side view of a bicycle comprising an electronic system according to the invention.

With reference now to FIG. 1, a bicycle 1000 is provided with an electronic system 1002.

The electronic system 1002 comprises at least one piece of equipment 1004.

Merely as an example, the electronic system 1002 illustrated is an electronic gearshift of the bicycle 1000 and comprises in particular two pieces of electromechanical equipment 1004, in specifically a front derailleur 1006 and a rear derailleur 1008. However, the at least one controlled piece of equipment 1004 could be a suspension, a lighting system, a satellite navigator, a training device, an anti-theft device, a cycle computer capable of providing information on the state of the bicycle, of the cyclist and/or of the route, etc.

The front and rear derailleurs 1006, 1008 are part of a motion transmission system of the bicycle 1000, which further comprises a chain 1010 extending between toothed wheels 1012, 1014 associated with the axle of the pedal cranks 1016 and with the hub 1018 of the rear wheel 1020.

More in detail, in a motion transmission system of a bicycle 1000 a gearshift is provided for—and, therefore, a front derailleur 1006 and/or a rear derailleur 1008 is/are provided for—when there is an assembly of toothed wheels 1012, 1014 comprising more than one toothed wheel 1012, 1014, at at least one of the axle of the pedal cranks 1016 and the hub 1018 of the rear wheel 1020.

A front derailleur 1006 and/or a rear derailleur 1008, whose features are well known in the technical field, serve(s) the function of displacing the chain 1010 among the toothed wheels 1012, 1014 in order to change the gear ratio of the bicycle 1000.

In the case of an electronic gearshift, each derailleur typically comprises an electromechanical actuator, which displaces a movable element of the derailleur. The electromechanical actuator in turn comprises an electric motor.

The actuation of the derailleurs 1006, 1008 occurs based on commands manually input by the cyclist through one or more manual control devices 10 mounted on the handlebars 1022 of the bicycle 1000.

Each manual control device 10 comprises a support body 12 configured to be fixed to the bicycle 1000, typically at a handgrip 1024, 1025 of the handlebars 1022, so as to be easily reached by the cyclist during a travel condition of the bicycle 1000. The input of commands by the cyclist occurs through one or more manual actuation members 14, typically in the form of levers, as shown, or buttons, provided on the manual control device 10.

FIG. 1 shows, merely for illustrative purposes, manual control devices 10 configured for handlebars 1022 of drop bar type, however the manual control devices 10 can have a different configuration than the one shown, so as to adapt also to different types of handlebars, for example T-bar. Still alternatively, the manual control devices 10 can be of the bar-end type.

The number, type, shape and position of the manual control devices 10 in the bicycle 1000 can change based on requirements.

With particular—but not exclusive—reference to manual control devices 10 for a derailleur 1006, 1008 or in general for a gearshift of the bicycle 1000, mounting of a single manual control device 10 on the right handgrip 1024 and of a single manual control device 10 on the left handgrip 1025 may be provided for. In this case, the manual control device mounted on the left can substantially be the mirror image of the manual control device mounted on the right.

Of course, it is possible to provide for manual control devices 10 fixed elsewhere on the frame of the bicycle 1000, for example at the attachments of a bottle-holder, close to the seat tube, close to a derailleur 1006, 1008, etc.

Within the electronic system 1002, the communication between each manual control device 10 and the at least one piece of equipment 1004 controlled thereby may occur in any per se well known manner.

Each of the manual control devices 10 of the bicycle 1000 may comprise a communication module 26 suitable for exchanging data and/or information, more generally signals, with a respective communication module 27 suitably provided for in each piece of equipment 1004 controlled thereby. In FIG. 1 a communication module 26 for each control device 10 and a communication module 27 for each controlled piece of equipment 1004 are generically indicated, although such communication modules 26, 27 are not physically visible in FIG. 1.

The communication module 26 serves the main function of transmitting, according to a specific protocol, a signal that represents the command addressed to the controlled piece of equipment 1004, and the communication module 27 serves the main function of receiving the signal and extracting useful information therefrom according to the specific protocol, and such main functions will be referred to hereinafter. Moreover, the communication module 27 can serve the function of transmitting feedback signals of the controlled piece of equipment 1004 to the communication module 26 of the manual control device 10.

In an alternative not shown, the communication from the manual control device 10 to the controlled piece of equipment 1004 can be indirect, one or more intermediate units being provided for, such as for example a so-called interface unit that receives the commands from all the manual control devices 10 of the electronic system 1002 of the bicycle 1000 and/or a central processing unit of the electronic system 1002 of the bicycle 1000, according to configurations that are per se well known in the field. In such case, the communication module 26 of the manual control device 10 will be in communication with a communication module 27 on one of such intermediate units.

In yet other cases, the various components of the electronic system 1002 can be connected in a more complex communication network, for example a star or mesh type network, the modifications to be made being within the skills of those skilled in the art.

The communication between a manual control device 10 and the at least one controlled piece of equipment 1004 can be wired or wireless.

In principle, in wired electronic systems, the communication modules 26, 27 could be absent; however, given the complexity of modern electronic systems, there is nearly always a communication module dedicated to carry out, on the signals, the specific operations of the communication protocol, before they are transmitted and/or after they are received.

FIG. 1 illustrates as an example a wireless electronic system 1002. The manual control devices 10 and the respective controlled pieces of equipment 1004 are therefore provided with wireless communication modules 26, 27, for example of a radio wave or infrared type.

In a communication system, two or more devices must first be coupled together, performing a pairing procedure at the time of their first use—or upon express request of the user, for example after replacement of one of the devices. The pairing procedure configures the devices to be coupled so that they share the communication protocol and the values of the parameters necessary for a correct exchange of signals and/or information. This pairing procedure requires a certain timeframe to be carried out.

The communication among control devices 10 and controlled pieces of equipment 1004, or more generally among different devices within the electronic system 1002, can occur according to a synchronous or asynchronous communication protocol.

As is well known to those skilled in the art, an "asynchronous system" is a system in which the exchange of signals, data and/or information among two or more devices, in particular among their communication modules, occurs at non-predetermined instants.

In other words, the devices that communicate with each other according to an asynchronous protocol typically each have their own independent time reference or clock, and the time references of such devices are not synchronized with each other. A device can transmit signals to another device in the asynchronous system at any time; the receiving device, in the example of FIG. 1 in particular one of the derailleurs 1006, 1008, must be ready to receive, namely its communication module 27 must be active, constantly or at least cyclically for time intervals of a certain duration.

In an asynchronous system, only a unidirectional communication is therefore typically used, more in particular from a communication module 26 that transmits, which typically is activated at the time of transmission of the signal, to a communication module 27 that receives at least in the aforementioned time intervals, although bidirectional communication is also possible.

As is well known, a "synchronous system", on the other hand, is a system within which the exchange of signals, data and/or information among two or more devices occurs at predetermined intervals.

In other words, the devices that communicate with each other according to a synchronous communication protocol have time references or clocks synchronized with each other, and the communication is allowed only in certain timeframes.

A synchronous system further facilitates a bidirectional communication among two or more devices of the electronic system 1002.

Once coupled through the pairing procedure, two or more devices must furthermore, when switched on or awoken from a standby mode, follow a connection procedure in order to "find each other" within the system and re-configure for the exchange of information.

This connection procedure also requires a certain amount of time to be carried out.

Advantageously, according to the invention and as better described hereinafter, the manual control devices 10 do not enter standby mode during use of the bicycle 1000, so that the connection procedure is carried out only once for each use of the bicycle 1000. The connection times are thus completely eliminated—apart from the one when switching on—and the command intended by the cyclist is promptly forwarded to the controlled piece of equipment 1004.

A manual control device 10 that achieves such an advantage, as well as those mentioned in the introductory part of the present disclosure, will now be described in greater detail, with reference also to FIG. 2.

As already stated, the manual control device 10 comprises at least one manual actuation member 14 supported by the support body 12 in a movable manner, typically between a rest position and at least one operating position.

In order to issue a command addressed to a specific piece of equipment 1004, such as for example the derailleur 1006, 1008 of the electronic gearshift 1002 of the bicycle 1000, the cyclist actuates the at least one manual actuation member 14 of the manual control device 10, displacing it from the rest position to the or an operating position.

Figure 2:
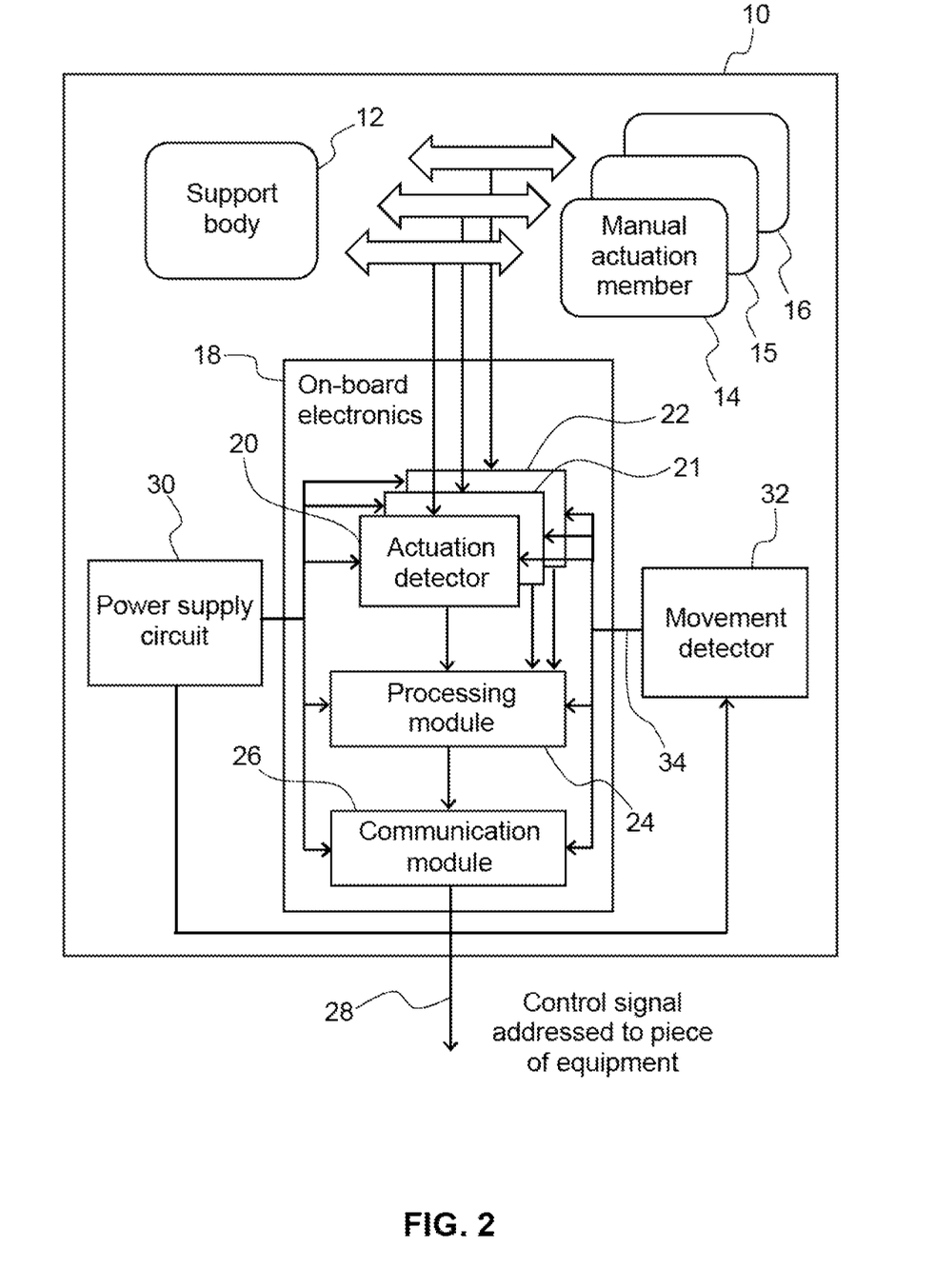
FIG. 2 illustrates the main components of a manual control device according to the invention.

FIG. 2 schematically shows a manual actuation member 14 of the manual control device 10. In a totally exemplary and non-limiting manner, possible further manual actuation members 15, 16 are also illustrated.

The number, type, shape and position of the manual actuation members 14, 15, 16 in one and the same manual control device 10 could of course change based on the requirements and/or the functionalities of the controlled piece(s) of equipment 1004, in general it can change based on the number of different signals that the individual manual control device 10 should be capable of issuing to one or more controlled pieces of equipment 1004.

Different manual actuation members 14, 15, 16 of the manual control device 10 could issue different control signals to a same piece of equipment 1004. In a practical example, the manual control device 10 could control a derailleur 1006, 1008 of the gearshift of the bicycle 1000, two manual actuation members 14, 15 thereof respectively issuing an upward gearshifting request command and a downward gearshifting request command.

In an alternative example, a manual actuation member 14 could issue gearshifting request commands to a derailleur 1006, 1008 of an electronic gearshift of the bicycle 1000, while another manual actuation member 15 could be a mode button associated with configuration and/or with pairing, which mode button in principle should not be actuated during normal use of the bicycle 1000.

In a particular configuration, the manual control device 10 comprises a first manual actuation member 14 for issuing a gearshifting request command in one direction to the rear derailleur 1008, and a second manual actuation member 15 of the mode type, a second manual control device, comprising a first manual actuation member for issuing a gearshifting request command in the opposite direction to the rear derailleur 1008, and a second manual actuation member of the mode type being provided for in the system.

Yet alternatively, different manual actuation members 14, 15, 16 of the manual control device 10 could each control a different piece of equipment 1004 of the bicycle 1000. For example, a manual actuation member 14 could issue commands to a derailleur 1006 of the gearshift and another manual actuation member 15 could issue commands to a different piece of equipment 1004, such as for example an electronic suspension or other.

In yet alternative cases, the manual control device 10 could be provided with manual actuation members actuatable in two or more different ways by the cyclist, so as to be able to issue different commands with a single manual actuation member. For example, as already stated above, bidirectional control levers or levers that issue different signals based on the angle by which they are rotated, the actuation time, the number of rapidly succeeding actuations, etc., are known in the field.

The actuation of the manual actuation members 14, 15, 16 of the manual control device 10 is detected by suitable actuation detectors part of on-board electronics 18 of the manual control device 10.

In a practical embodiment, the electronic components forming the on-board electronics 18 of the manual control device 10 are for example integrated on one or more printed circuit boards (PCB), supported by, and in particular contained in, the support body 12.

As shown in FIG. 2, the on-board electronics 18 comprises in particular an actuation detector 20, suitable for detecting the actuation of the manual actuation member 14. Merely as an example and not for limiting purposes, further detection elements 21, 22, suitable for detecting the actuation of the possible further manual actuation members 15, 16 of the manual control device 10, are also illustrated.

More in general, it is not necessary for the manual actuation members and the actuation detectors to be in one-to-one correspondence, as described in the introductory part of the present disclosure.

Reference will be made hereinafter, for the sake of brevity, to only the manual actuation member 14 and to the corresponding actuation detector 20, even though what will be described holds true for any manual actuation member 14, 15, 16 of the manual control device 10 and for any corresponding actuation detector 20, 21, 22.

Following the actuation of the manual actuation member 14, the actuation detector 20 generates a suitable electric control signal 28, addressed to the controlled piece of equipment 1004. It should be noted that in FIG. 2, reference numeral 28 is indicated downstream of an optional processing module 24, described hereinafter, and of the communication module 26, also optional.

Advantageously, the actuation detector 20 is embodied by a sensor, more in particular by a magnetic field sensor.

A magnetic field sensor detects a value of a magnetic field generated by a magnet.

It is possible, for example, to provide for a magnetic field sensor mounted in a fixed position on the support body 12 of the manual control device 10 and for a magnet fixedly connected to, and as a consequence movable with, the manual actuation member 14, or vice-versa. When the manual actuation member 14 is actuated, the position of the magnet fixedly connected thereto changes with respect to the sensor, that is fixed, causing a change in the value of the detected magnetic field.

The magnetic field sensor detects the actuation of the manual actuation member 14 based on the change of the value of the magnetic field, and generates, in response thereto, a suitable control signal 28 addressed to the controlled piece of equipment 1004.

In general, when a magnetic field sensor is used, the output signal could for example have two levels, depending on whether the magnetic field in which it is immersed is less than or greater than a predetermined threshold. Alternatively, the output signal of the sensor could be an analog signal.

In a practical embodiment, the magnetic field sensor can comprise, for example, a Hall effect sensor or a Reed relay. Magnetic field sensors of the aforementioned type are well known.

As an alternative to magnetic field sensors, the actuation detector 20 could be embodied by a sensor of a different type, such as for example an inductive, capacitive, optical, ultrasound sensor, etc.

It should be noted that when the actuation detector 20 is embodied by a sensor, it needs to be powered by a suitable power supply source. In this case, advantageously the actuation detector 20 will have a standby mode and an operating mode.

Alternatively, the actuation detector 20 can be embodied by a switch.

The switch can be electromechanical, for example of the microswitch type, including a deformable dome-shaped diaphragm. For the switching of the switch, an actuation head of, or connected to, the first manual actuation member faces the deformable diaphragm in the rest condition of the manual actuation member, and acts by pushing on the deformable diaphragm in the actuation condition of the first manual actuation member.

It should be noted that in this case the opening and closing of the switch occur following a mechanical action: switches of this type do not need to be powered to operate.

Alternatively, more complex switches could be used, such as for example relays, MOSFET, etc. These components, unlike the electromechanical switches outlined above must be suitably powered in order to operate. These types of actuation detector, like the sensors, can also have a standby mode and an operating mode.

An actuation detector 20 of the sensor type may be preferable with respect to a switch because it allows the mechanical components of the manual control device 10 to be decoupled from those of the on-board electronics 18, which in turn allows the electronic components to be suitably insulated from the external environment.

For the sake of brevity, a single manual actuation member/actuation detector pair has been described, just as for the sake of ease of illustration, FIG. 2 shows an actuation detector 20, 21, 22 dedicated to each manual actuation member 14, 15, 16.

However, it is possible to provide for a single actuation detector 20 intended for detecting the actuation, in a distinct or combined manner, of two or more manual actuation members. For example, if the actuation detector is a magnetic field sensor, two or more manual actuation members can be each provided with a magnet, and thus the sensor can detect the actuation thereof through the overall value of the detected magnetic field, altered by the displacement of the magnets. The positioning of the sensor and of the magnets must be suitably configured so that the sensor can possibly discern, from the overall value of the detected magnetic field, which manual actuation member(s) has/have been actuated at any time.

Vice-versa, it is possible to provide for different actuation detectors dedicated to a single manual actuation member. Each actuation detector can for example detect such actuation through a different parameter and, thereafter, the outputs of the different actuation detectors can be suitably compared with each other so as to make the detection more precise. Multiple actuation detectors could furthermore be useful in the case of actuation members actuatable in two or more different manners by the cyclist.

The on-board electronics 18 of the manual control device 10 can furthermore optionally comprise, irrespective of the type of actuation detector 20, a processing module 24 of the control signal 28 emitted by the actuation detector 20, especially if the latter is embodied by a sensor. The processing module 24 comprises for example electronic components for amplification, filtering and/or approximation, quantization, binarization, digitalization, inversion etc.

As stated above, the processing module 24 can in particular be embodied by a controller or, more specifically, by a microcontroller.

The control signal 28 emitted by the actuation detector 20, and possibly suitably processed by the processing module 24, can be further processed by the aforementioned communication module 26.

The communication module 26, also part of the on-board electronics 18, transmits the electric control signal 28, directly or indirectly, to a corresponding communication module 27 with which the controlled piece of equipment 1004 is provided.

As stated, the communication module 26 of the manual control device 10 can also receive feedback signals from the controlled piece of equipment 1004. Such feedback signals can also be possibly translated into a visual or audible feedback for the cyclist, by providing for example, on the manual control device 10, sound or luminous signaling devices (for example LEDs, not shown) that are activated when such a feedback signal arrives from the controlled piece of equipment 1004.

In a practical example, such a luminous or sound signaling device on the manual control device 10 could indicate to the cyclist when one of the derailleurs 1006, 1008 of the bicycle 1000 of FIG. 1 has correctly carried out gearshifting in response to a command issued by him/her.

The components of the on-board electronics 18 need to be powered by a suitable power supply source.

In order to limit the consumption of electrical energy supplied by the power supply source, such components of the on-board electronics 18, or at least some of them, are provided with a standby mode. Such a standby mode can furthermore be provided for any piece of equipment 1004, or even more generally electrical/electronic component, of the bicycle 1000.

Preferably, the manual control device 10 comprises an electric power supply circuit 30.

In embodiments, the electric power supply circuit 30 comprises a battery power supply source, in particular a smart battery, preferably supported by, and in particular housed in, the support body 12 of the manual control device 10, and preferably dedicated to the manual control device 10 only.

In other embodiments, the electric power supply circuit 30 is configured to absorb energy from a radio frequency electromagnetic field generated in the bicycle electronic system 1002 of which the manual control device 10 is part, exploiting RFID technology.

The on-board electronics 18 can in this way be powered by a battery power supply source shared by one or more pieces of equipment 1004 of the electronic system 1002; in this case, the battery power supply source can be suitably located on the frame of the bicycle 1000, for example arranged at the attachments of a bottle-holder or close to the seat tube, or close to other pieces of equipment 1004 of the bicycle 1000 that share the same battery power supply source.

As an alternative to the use of RFID technology, the on-board electronics 18 can be wired to the shared battery power supply source.

Advantageously, according to the invention the manual control device 10 comprises a movement detector 32 of the bicycle 1000.

The movement detector 32 is configured to emit a wake signal 34 to bring the components of the on-board electronics 18 into an operating mode from a standby mode, and possibly to keep them in such an operating mode.

Only when the bicycle 1000 is stopped for a prolonged period, the components of the on-board electronics 18 of each manual control device can enter standby mode. The on-board electronics 18 can for example be sent back into standby once a predetermined timeframe has passed, which is monitored through a suitable timer that is reset every time the movement detector 32 detects the movement of the bicycle 1000: in order to distinguish a prolonged stop, for example in a parking space or garage, from a temporary stop, for example at a traffic light, it is therefore possible to use the same wake signal 34 emitted by the movement detector 32 to prevent standby mode from being entered, namely as anti-sleep signal.

Thanks to entering standby mode, the manual control device 10 achieves an overall energy saving, despite the energy consumption of the movement detector 32.

In this regard, it should be noted that in the case of a manual control device 10 used to issue control signals to a derailleur 1006, 1008, the manual control device 10 typically comprises manual actuation members 14, 15, 16 provided to issue three different signals: an upward gearshifting request signal, a downward gearshifting request signal, and a mode (mode change) signal; when the front derailleur 1006 is absent and the two right and left controls are both used for example for the rear derailleur 1008, the manual control device 10 typically comprises two manual actuation members 14, 15 provided to issue two different signals: a mode signal and a respectively upward or downward gearshifting request signal. In these cases, there are typically two, or even three, actuation detectors 14, 15, 16 that can be sent into standby, besides the possible processing and communication electronics.

Furthermore, the movement detector 10 can be actuated to carry out checks of the movement state of the bicycle 1000 also at comparatively long time intervals, and/or it can have a lower electrical consumption, with respect to the actuation detectors 20, 21, 22 of the manual actuation members 14, 15, 16, and thus the electrical consumption thereof is comparatively low.

The wake signal 34 emitted by the movement detector 32 can furthermore be exploited to wake from a standby mode not only the on-board electronics 18 of the manual control device 10, rather also other pieces of equipment 1004 or in general electronic devices of an electronic system 1002 of the bicycle 1000, such as for example a derailleur 1006, 1008 of the gearshift or a display of a cycle computer with which the bicycle 1000 may be provided; it should be understood that such other pieces of equipment 1004 of the bicycle 1000 could alternatively be provided with their own movement detector suitable for generating a suitable wake signal.

Furthermore, the wake signal 34 emitted by the movement detector 32 could be exploited to wake from a standby mode a battery power supply unit, when embodied by a smart battery, both in case the latter is a dedicated battery power supply unit of the control device 10, and in case it is located elsewhere on the frame of the bicycle 1000.

Preferably, the movement detector 32 comprises a vibration sensor that detects the vibrations caused by irregularities in the road surface or in general by the motion of the transmission system of the bicycle 1000. The vibration sensor 32 can be embodied for example by a piezoelectric accelerometer.

Alternatively, the movement detector 32 can be embodied by another type of sensor, for example a clinometer, a gyroscope, etc.

Preferably, also the movement detector 32 has a standby mode.

The on-board electronics 18, once it has been brought into operating mode through the wake signal 34 generated by the movement detector 32, can thus advantageously send the latter into standby mode.

Alternatively, the movement detector 32 can be configured to automatically enter standby mode immediately after the wake signal 34 has been sent to the on-board electronics 18.

In both cases, the on-board electronics 18 is advantageously configured to remain in operating mode until a sleep condition has been reached, the movement detector 32 then entering operating mode, instead. In other words, the on-board electronics 18 and the movement detector 32 are in operating mode at alternate times, so as to further reduce power consumption.

In order to determine said sleep condition of the on-board electronics 18, it is no longer possible to use the configuration described above of a timer to send the on-board electronics 18 into standby mode, which is reset by the wake signal 34 generated by the movement detector 32. The on-board electronics 18 is therefore sent into standby mode—and the movement detector 32 is awoken—for example upon instructions by the controlled piece of equipment 1004 or by another component of the electronic system 1002 of which it is part. Or else, the on-board electronics 18 wakes the movement detector 32 and automatically enters standby mode when the communication module 26 does not receive feedback signals from the controlled piece of equipment 1004 for a certain time period.

What is claimed is:

1. A bicycle manual control device for issuing at least one electric-electronic command to at least one piece of bicycle equipment, the bicycle manual control device comprising:
    a support body, configured to be fixed to a bicycle,
    at least one manual actuation member supported in a movable manner by the support body,
    on-board electronics having a standby mode and an operating mode, and a movement detector of the bicycle configured to emit a wake signal to bring said on-board electronics from the standby mode to the operating mode.

2. The bicycle manual control device according to claim 1, wherein the movement detector comprises a vibration sensor.

3. The bicycle manual control device according to claim 1, wherein the movement detector has a standby mode.

4. The bicycle manual control device according to claim 1, wherein the on-board electronics comprises at least one actuation detector configured to detect the actuation by a cyclist of said at least one manual actuation member and generate a control signal in response thereto.

5. The bicycle manual control device according to claim 4, wherein said at least one actuation detector comprises a switch or a sensor.

6. The bicycle manual control device according to claim 4, wherein the on-board electronics comprises a processing module of the control signal generated by said at least one actuation detector.

7. The bicycle manual control device according to claim 4, wherein the on-board electronics comprises a communication module configured to send, directly or indirectly, said control signal to said at least one piece of bicycle equipment.

8. The bicycle manual control device according to claim 4, wherein said at least one actuation detector comprises a magnetic field sensor.

9. The bicycle manual control device according to claim 1, wherein the manual control device comprises an electric power supply circuit.

10. An electronic system of a bicycle, comprising at least one bicycle manual control device according to claim 1, and at least one piece of equipment controlled by said at least one bicycle manual control device.

11. The electronic system according to claim 10, wherein said at least one bicycle manual control device comprises a first communication module, and a component of the electronic system comprises a second communication module, the first communication module and the second communication module being configured to communicate with each other.

12. The electronic system according to claim 11, wherein the first communication module and the second communication module are wireless communication modules.

13. The electronic system according to claim 11, wherein said at least one piece of equipment controlled by said manual control device comprises the second communication module.

14. The electronic system according to claim 11, wherein the first communication module and the second communication module follow a synchronous communication protocol.

15. The electronic system according to claim 10, wherein the movement detector of the at least one bicycle manual control device is configured to send a wake signal also to the at least one controlled piece of equipment.

16. A bicycle manual control device for issuing at least one electric-electronic command to at least one piece of bicycle equipment, the bicycle manual control device comprising:

a support body, configured to be fixed to a bicycle, at least one manual actuation member supported in a movable manner by the support body, on-board electronics having a standby mode and an operating mode, and a movement detector of the bicycle configured to emit a wake signal to bring said on-board electronics from the standby mode to the operating mode, wherein the movement detector has a standby mode and the on-board electronics, once the on-board electronics has been brought into the operating mode through the wake signal generated by the movement detector, sends the movement detector into the standby mode.

17. The bicycle manual control device according to claim 16, wherein the on-board electronics is configured to remain in the operating mode until a sleep condition has been reached, the movement detector then entering the operating mode.

18. A bicycle manual control device for issuing at least one electric-electronic command to at least one piece of bicycle equipment, the bicycle manual control device comprising:

a support body, configured to be fixed to a bicycle, at least one manual actuation member supported in a movable manner by the support body, on-board electronics having a standby mode and an operating mode, and a movement detector of the bicycle configured to emit a wake signal to bring said on-board electronics from the standby mode to the operating mode, the movement detector has a standby mode, and wherein the movement detector is configured to automatically enter the standby mode immediately after the wake signal has been sent to the on-board electronics.

19. The bicycle manual control device according to claim 18, wherein the on-board electronics is configured to remain in the operating mode until a sleep condition has been reached, the movement detector then entering the operating mode.

* * * * *